US012529973B2

(12) United States Patent
Komuro et al.

(10) Patent No.: US 12,529,973 B2
(45) Date of Patent: Jan. 20, 2026

(54) TONER

(71) Applicant: CANON KABUSHIKI KAISHA, Tokyo (JP)

(72) Inventors: Masaya Komuro, Shizuoka (JP); Masao Suzuki, Kanagawa (JP); Kenji Ookubo, Shizuoka (JP); Naoya Isono, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 440 days.

(21) Appl. No.: 18/327,506

(22) Filed: Jun. 1, 2023

(65) Prior Publication Data

US 2023/0400789 A1 Dec. 14, 2023

(30) Foreign Application Priority Data

Jun. 8, 2022 (JP) ................................ 2022-092760

(51) Int. Cl.
*G03G 9/097* (2006.01)
*C08G 63/20* (2006.01)
(Continued)

(52) U.S. Cl.
CPC ............ *G03G 9/091* (2013.01); *C08G 63/20* (2013.01); *G03G 9/08755* (2013.01)

(58) Field of Classification Search
CPC ...................... G03G 9/09708; G03G 9/09725
See application file for complete search history.

(56) References Cited

U.S. PATENT DOCUMENTS 8,367,289 B2 2/2013 Isono
8,440,382 B2 5/2013 Isono
(Continued)

FOREIGN PATENT DOCUMENTS

JP 2003-280246 A 10/2003
JP 2013-113981 A 6/2013

OTHER PUBLICATIONS

U.S. Appl. No. 18/321,312, Keisuke Adachi, filed May 22, 2023.
U.S. Appl. No. 18/350,260, Kenji Ookubo, filed Jul. 11, 2023.

*Primary Examiner* — Peter L Vajda
(74) *Attorney, Agent, or Firm* — VENABLE LLP

(57) ABSTRACT

A toner comprising a toner particle comprising a binder resin, wherein the toner particle comprises a compound represented by a following structural formula (1) and a compound represented by a following structural formula (2), and a content of the compound represented by the following structural formula (2) comprised in the toner is 0.3 mass ppm or more, (1)

(2)

(Continued)

7 Claims, 1 Drawing Sheet

(51) Int. Cl.
*G03G 9/087* (2006.01)
*G03G 9/09* (2006.01)

(56) References Cited

U.S. PATENT DOCUMENTS

| | | | |
|---|---|---|---|
| 8,497,054 | B2 | 7/2013 | Sugiyama |
| 8,652,737 | B2 | 2/2014 | Handa |
| 8,778,581 | B2 | 7/2014 | Nonaka |
| 9,158,216 | B2 | 10/2015 | Shimano |
| 9,377,705 | B2 | 6/2016 | Shimano |
| 9,383,668 | B2 | 7/2016 | Noji |
| 9,500,972 | B2 | 11/2016 | Tanaka |
| 9,575,424 | B2 | 2/2017 | Nakagawa |
| 9,599,919 | B2 | 3/2017 | Isono |
| 9,658,549 | B2 | 5/2017 | Tanaka |
| 9,785,071 | B2 | 10/2017 | Shimano |
| 9,829,816 | B2 | 11/2017 | Tanaka |
| 9,835,964 | B2 | 12/2017 | Yoshida |
| 9,880,478 | B2 | 1/2018 | Shimano |
| 9,904,193 | B2 | 2/2018 | Nakagawa |
| 9,958,801 | B2 | 5/2018 | Tanaka |
| 10,054,866 | B2 | 8/2018 | Tanaka |
| 10,078,279 | B2 | 9/2018 | Nakagawa |
| 10,101,681 | B2 | 10/2018 | Tagawa |
| 10,151,990 | B2 | 12/2018 | Suzuki |
| 10,216,107 | B2 | 2/2019 | Tsubaki |
| 10,545,420 | B2 | 1/2020 | Kinumatsu |
| 10,732,530 | B2 | 8/2020 | Matsui |
| 10,877,388 | B2 | 12/2020 | Aoki |
| 10,877,389 | B2 | 12/2020 | Kamikura |
| 10,948,839 | B2 | 3/2021 | Tsubaki |
| 11,079,695 | B2 | 8/2021 | Sato |
| 11,086,242 | B2 | 8/2021 | Isono |
| 11,181,845 | B2 | 11/2021 | Shimoda |
| 11,249,412 | B2 | 2/2022 | Kawamura |
| 11,287,758 | B2 | 3/2022 | Matsui |
| 11,714,363 | B2 | 8/2023 | Ookubo |
| 2016/0246192 | A1* | 8/2016 | Yoshida ............... G03G 9/0821 |
| 2021/0318631 | A1 | 10/2021 | Isono |
| 2022/0075284 | A1 | 3/2022 | Nakayama |
| 2022/0128915 | A1 | 4/2022 | Toyoda |
| 2022/0128916 | A1 | 4/2022 | Yoshida |
| 2022/0128919 | A1 | 4/2022 | Kawamura |
| 2022/0146953 | A1 | 5/2022 | Kyuushima |
| 2022/0146954 | A1 | 5/2022 | Kato |
| 2022/0390870 | A1 | 12/2022 | Kyuushima |
| 2022/0390871 | A1 | 12/2022 | Isono |
| 2022/0397836 | A1 | 12/2022 | Toyoda |
| 2022/0404730 | A1 | 12/2022 | Nagaoka |

* cited by examiner

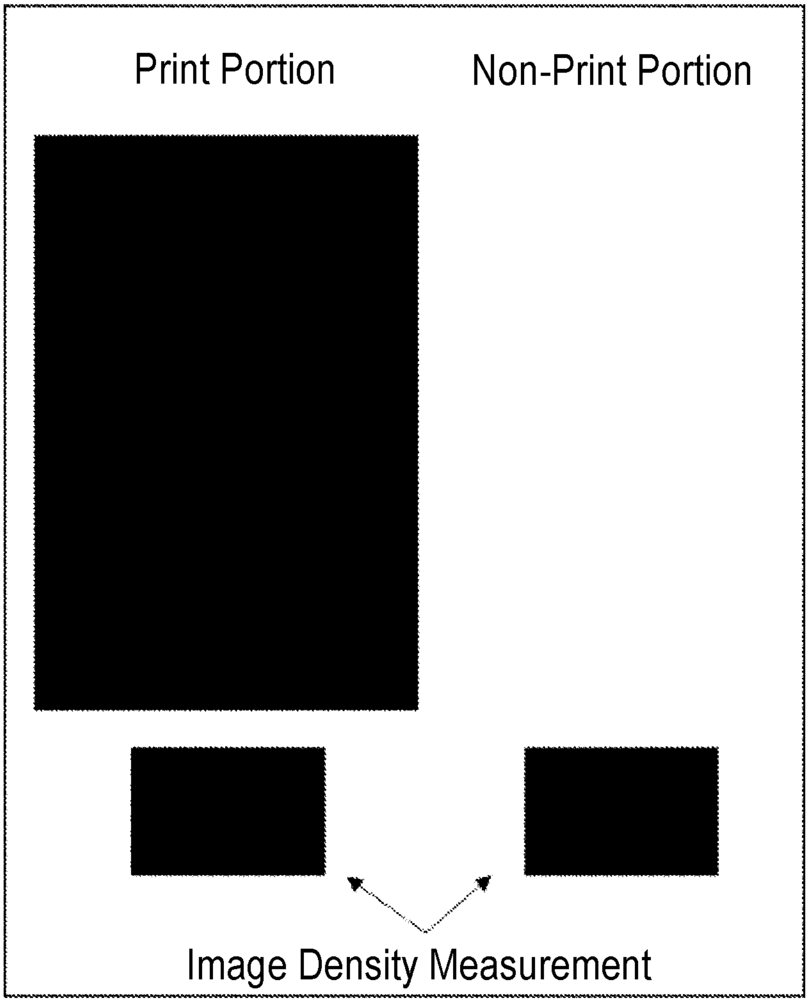
Print Portion
Non-Print Portion
Image Density Measurement

TONER

BACKGROUND OF THE INVENTION

Field of the Invention

The present disclosure relates to a toner used to form a toner image by developing an electrostatic latent image formed using a method such as an electrophotographic method, an electrostatic recording method, or a toner jet recording method.

Description of the Related Art

With electrophotographic technology used in photocopiers, printers, facsimile receivers, and the like, demand from users is becoming more severe year by year together with the development of devices. In recent trends, applications for advertisement and design are expanding, and output image are required to have a high level of color reproducibility. For this reason, toners used to form images are strongly required to expand the color gamut and improve the tinting strength.

As the colorant for a yellow toner, a pigment that contains a compound represented by the following structural formula (1) and has excellent weather resistance is commonly used.

(1)

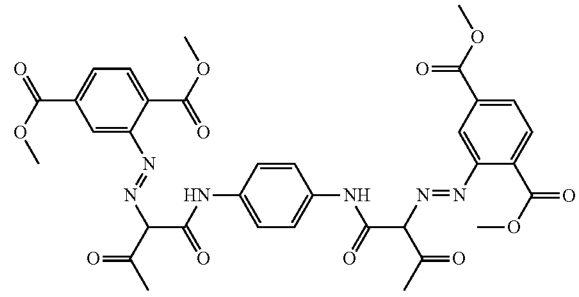

The reason that the pigment that contains the compound represented by the structural formula (1) has excellent weather resistance is considered to be that an intermolecular hydrogen bond is formed by a carbonyl group and an imino group, and thus the toner has a strong crystalline structure. However, when the pigment that contains the compound represented by the structural formula (1) is used as the colorant, the pigment is likely to aggregate due to a hydrogen bond, as a result of which, the tinting strength is reduced.

As means for improving the tinting strength, Japanese Patent Application Publication Nos. 2003-280246 and 2013-113981 disclose toners with improved colorant dispersibility obtained by subjecting pigments to rosin treatment using rosin acid.

SUMMARY OF THE INVENTION

According to the technique disclosed in the documents described above, the tinting strength is improved because rosin acid functions as a surfactant. However, because rosin acid has a carboxy group, the hydrophilicity of the compound represented by the structural formula (1) is not reduced. Accordingly, the compound represented by the structural formula (1) that still has high hydrophilicity adsorbs moisture particularly in a hot and humid environment, which causes image problems such as the occurrence of fogging and image density non-uniformity caused by a difference in the charge rising speed.

The present disclosure provides a toner with which image problems such as fogging and image density non-uniformity can be suppressed in a hot and humid environment even when a specific pigment is used.

The present disclosure relates to a toner comprising a toner particle comprising a binder resin, wherein

- the toner particle comprises a compound represented by a following structural formula (1) and a compound represented by a following structural formula (2), and
- a content of the compound represented by the following structural formula (2) comprised in the toner is 0.3 mass ppm or more, (1)

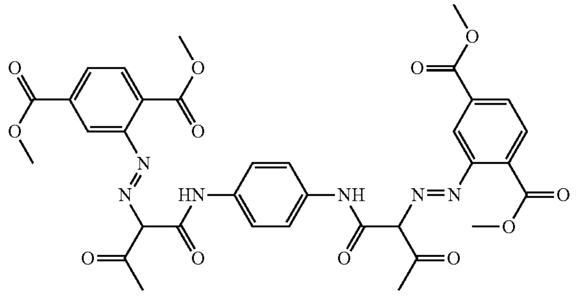

(2)

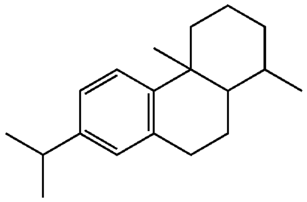

According to the present disclosure, it is possible to provide a toner with which image problems such as fogging and image density non-uniformity can be suppressed in a hot and humid environment even when a specific pigment is used. Further features of the present invention will become apparent from the following description of exemplary embodiments with reference to the attached drawings.

BRIEF DESCRIPTION OF THE DRAWINGS

The FIGURE is an image density non-uniformity evaluation image.

DESCRIPTION OF THE EMBODIMENTS

In the present disclosure, the terms "from XX to YY" and "XX to YY", which indicate numerical ranges, mean numerical ranges that include the lower limits and upper limits that are the end points of the ranges. In cases where numerical ranges are indicated incrementally, upper limits and lower limits of the numerical ranges can be arbitrarily combined.

Hereinafter, an embodiment of the present disclosure will be described in detail.

The present disclosure relates to a toner comprising a toner particle comprising a binder resin, wherein the toner particle comprises a compound represented by a following structural formula (1) and a compound represented by a following structural formula (2), and a content of the compound represented by the following structural formula (2) comprised in the toner is 0.3 mass ppm or more, (1)

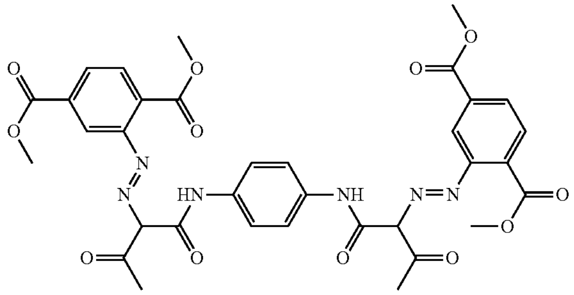

(2)

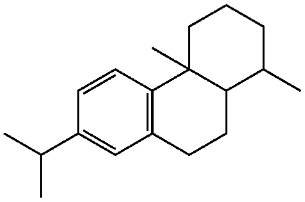

The inventors of the present application found that fogging and image density non-uniformity in a hot and humid environment can be suppressed when a toner particle comprises at least the compound represented by the structural formula (1) and the compound represented by the structural formula (2).

The inventors of the present application consider the detailed mechanism as follows.

The compound represented by the structural formula (1) has polar groups such as an imino group and a carbonyl group in a molecule, and thus has a relatively high hydrophilicity. For this reason, the toner that contains the compound represented by the structural formula (1) is likely to adsorb moisture in the air in a hot and humid environment. As a result of adsorbing moisture, the electric charges on the toner surface leak, resulting in a reduction in the charge quantity. It is considered that this causes fogging and image density non-uniformity.

Even when rosin treatment is performed to improve the pigment dispersibility, because rosin acid has a carboxy group in a molecule, the hydrophilicity of the compound represented by the structural formula (1) is not reduced, and moisture adsorption takes place. However, when the toner particle comprises the compound represented by the structural formula (2), the reduction in the charge quantity can be suppressed, and also fogging and image density non-uniformity can be suppressed.

The compound represented by the structural formula (2) has a structure that easily interacts with the compound represented by the structural formula (1), and also has a low molecular polarity and is easily mixed with the binder resin. From this, in the binder resin, the compound represented by the structural formula (1) is stabilized by interacting with the compound represented by the structural formula (2), and due to the presence of the compound represented by the structural formula (2) that has low hydrophilicity, the apparent hydrophilicity of the compound represented by the structural formula (1) is reduced.

It is presumed that this inhibits the moisture adsorption and suppresses the occurrence of image problems such as fogging and image density non-uniformity.

The content of the compound represented by the structural formula (2) comprised in the toner is required to be 0.3 mass ppm or more. The effect of suppressing the occurrence of image problems such as fogging and image density non-uniformity is exhibited when the content of the compound represented by the structural formula (2) is 0.3 mass ppm or more.

Hereinafter, a preferred embodiment of the toner will be described below.

The content of the compound represented by the structural formula (1) comprised in the toner is preferably 0.5 to 10.0 mass %, more preferably 2.5 to 8.0 mass %, even more preferably 3.0 to 7.0 mass %, and even much more preferably 4.0 to 6.0 mass %.

When the content of the compound represented by the structural formula (1) is mass % or more, the tinting strength, the tinge, and the like can be further improved. On the other hand, when the content of the compound represented by the structural formula (1) is 10.0 mass % or less, the fogging and the image density non-uniformity caused by an increase in the amount of moisture adsorbed by the compound represented by the structural formula (1) can be further suppressed.

Also, the content of the compound represented by the structural formula (2) comprised in the toner is preferably 0.5 to 10.0 mass ppm, more preferably 1.0 to 7.0 mass ppm, even more preferably 1.5 to 5.0 mass ppm, and even much more preferably 2.0 to 3.0 mass ppm.

When the content of the compound represented by the structural formula (2) is mass ppm or more, the moisture adsorption in a hot and humid environment can be further suppressed. On the other hand, when the content of the compound represented by the structural formula (2) is 10.0 mass ppm or less, it is possible to prevent a situation in which the compound represented by the structural formula (1) that interacts with the compound represented by the structural formula (2) is localized within the toner due to an increase in hydrophobicity, and thus the tinting strength can be maintained at a more favorable level. The content of the compound represented by the structural formula (2) can be controlled by adjusting the addition amount.

Also, a value of a ratio (A) of the content of the compound represented by the structural formula (1) comprised in the toner relative to the content of the compound represented by the structural formula (2) comprised in the toner is preferably 5000 to 100000, more preferably 10000 to 50000, and even more preferably 15000 to 30000.

When the ratio (A) takes a value within the above-described range, the reduction in the charge quantity in a humid environment can be further suppressed while ensuring the tinting strength of the toner.

(A)=Content of Compound Represented by Structural Formula (1)/Content of Compound Represented by Structural Formula (2)

Also, the binder resin has an SP value of preferably 9.5 to 10.6 $(cal/cm^3)^{0.5}$, and more preferably 9.6 to 10.0 $(cal/cm^3)^{0.5}$.

When the SP value is within the above-described range, the affinity of the structural formula (2) with the binder resin can be maintained at a favorable level, and the structural formula (2) can more easily interact with the compound represented by the structural formula (1).

Also, the toner particle preferably comprises an aluminum element. A value of a ratio (B) of the content of the compound represented by the structural formula (1) comprised in the toner relative to the content of the aluminum element comprised in the toner particle of the toner is preferably 3 to 105, more preferably 4 to 70, even more preferably 4 to 60, and yet even more preferably 5 to 50. As used herein, the content of the aluminum element refers to the content of the aluminum element comprised in the toner particle based on the mass of the toner.

(B)=Content of Compound Represented by Structural Formula (1)/Content of Aluminum Element Aluminum has a relatively high ionization tendency and thus is easily ionized. Accordingly, when the ratio (B) is 105 or less, aluminum ions are efficiently coordinated to the compound represented by the structural formula (1). As a result, the electron density in an aromatic ring of the compound represented by the structural formula (1) decreases, and the compound represented by the structural formula (1) more strongly interacts with the compound represented by the structural formula (2), and thus the effect of suppressing the reduction in the charge quantity is more significantly exhibited. On the other hand, when the ratio (B) is 3 or more, the leakage of electric charges of the toner due to aluminum ions can be suppressed, and the occurrence of fogging and image density non-uniformity can be further suppressed.

There is no particular limitation on the method for producing the toner particle. However, from the viewpoint of efficiently incorporating the compound represented by the structural formula (2) in the toner particle, it is preferable to use a method in which the toner particle is produced in an aqueous medium, such as a suspension polymerization method, an emulsion aggregation method, a dissolution suspension method, or the like.

Colorant

The compound represented by the structural formula (1) is used as a yellow pigment. For example, C.I. Pigment Yellow 155 that contains the compound represented by the structural formula (1) as the main component can be used.

The yellow pigment used in the toner may be treated with a treatment agent.

Also, as a pigment dispersant, a fatty acid metal salt or a metal salt of an aromatic carboxylic acid may be used.

The fatty acid metal salt or the metal salt of an aromatic carboxylic acid that may be used as the pigment dispersant is preferably an aluminum compound that contains aluminum ions that are easily coordinated to the compound represented by the structural formula (1).

In addition to the compound represented by the structural formula (1), a different pigment or dye may be used in combination as a colorant. For example, a yellow dye such as C.I. Solvent Yellow 98 or C.I. Solvent Yellow 162 may be used together with the compound represented by the structural formula (1).

The content of the colorant other than the compound represented by the structural formula (1) is preferably 0.3 to 10.0 parts by mass, and more preferably 0.5 to 3.0 parts by mass relative to 100.0 parts by mass of the binder resin.

Additive

In order to provide the toner with which image problems such as fogging and image density non-uniformity in a hot and humid environment can be suppressed, the compound represented by the structural formula (2) is added.

The compound represented by the structural formula (2) may be a commercially available compound. For example, the compound represented by the structural formula (2) is available as an isooctane solution (available from Fuji Chemicals, Ltd.) of the compound represented by the structural formula (2).

Charge Control Agent

The toner may optionally contain a charge control agent. As the charge control agent, a known charge control agent can be used.

Examples of specific compounds that can be used as a negative charge control agent include: a metal compound of an aromatic carboxylic acid such as salicylic acid, alkyl salicylic acid, dialkyl salicylic acid, naphthoic acid, or dicarboxylic acid; a metal salt of an azo dye; a metal salt of an azo pigment; a metal complex of an azo dye; a metal complex of an azo pigment; a boron compound; a silicon compound; and calixarene.

Examples of specific compounds that can be used as a positive charge control agent include a quaternary ammonium salt, a polymer compound that has a quaternary ammonium salt in a side chain, a guanidine compound, a nigrosine-based compound, and an imidazole compound.

These charge control agents may be used alone or in a combination of two or more.

As a charge control agent other than a resin-based charge control agent, a metal-containing salicylic acid-based compound or a metal-containing stearic acid-based compound is preferable. In particular, an aluminum or zirconium-containing salicylic acid-based compound, or an aluminum or zirconium-containing stearic acid-based compound is preferable. It is particularly preferable to use a salt of aluminum and a straight-chain saturated fatty acid with 12 to 30 (preferably 16 to 24) carbon atoms such as aluminum distearate as the control agent.

As the resin-based charge control agent, it is preferable to use a polymer or a copolymer that has a sulfonic acid group, a sulfonic acid salt group, a sulfonic acid ester group, a salicylic acid site, or a benzoic acid site.

The addition amount of the charge control agent is preferably from 0.01 parts by mass to 10.0 parts by mass, more preferably from 0.06 parts by mass to 1.2 parts by mass relative to 100 parts by mass of the binder resin.

Flocculant

When producing the toner, a flocculant may also be optionally used. An additive that forms a complex or a similar bond with metal ions of the flocculant may also be optionally used. As the additive, a chelating agent is preferably used.

Examples of inorganic metal salts include: metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may be used. Examples of the chelating agent include oxycarboxylic acids such as tartaric acid, citric acid, and gluconic acid, iminodiic acid (IDA), nitrilotriacetic acid (NTA), ethylenediaminetetraacetic acid (EDTA), and the like.

From the viewpoint of incorporating an aluminum element in the toner particle, an aluminum-containing flocculant such as aluminum chloride, aluminum sulfate, polyaluminum chloride, or polyaluminum hydroxide is preferably used.

Aluminum Element

The toner particle preferably comprises an aluminum element. An aluminum element can be incorporated in the toner by using an aluminum compound in, for example, the charge control agent or the flocculant described above.

Binder Resin

There is no particular limitation on the resin that can be used as the binder resin. Any resin that is conventionally used in toners can be used. Examples include a polyester resin, a vinyl resin, a polyamide resin, a furan resin, epoxy resin, a xylene resin, a silicone resin, and the like.

Among these, the binder resin preferably contains at least one selected from the group consisting of a vinyl resin and a polyester resin. More preferably, the binder resin contains a vinyl resin. The binder resin preferably has an SP value of 9.5 to 10.6 $(cal/cm^3)^{0.5}$.

The toner particle may be a toner particle that has a core-shell structure that includes a core particle and a shell on the surface of the core particle. For example, the binder resin comprised in the core particle is preferably a vinyl resin, and that in the shell is preferably a polyester resin.

Examples of a polymerizable monomer that can form a vinyl resin include: a styrene-based monomer such as styrene, a-methyl styrene, or divinylbenzene; an unsaturated carboxylic acid ester such as methyl acrylate, butyl acrylate, methyl methacrylate, 2-hydroxyethyl methacrylate, butyl methacrylate, or 2-ethylhexyl methacrylate; an unsaturated carboxylic acid such as acrylic acid and methacrylic acid; an unsaturated dicarboxylic acid such as maleic acid; an unsaturated dicarboxylic acid anhydride such as a maleic anhydride; a nitrile-based vinyl monomer such as acrylonitrile; a halogen-containing vinyl monomer such as vinyl chloride; a nitro-based vinyl monomer such as nitrostyrene; and the like. These may be used alone or in a combination of two or more.

It is preferable to use a copolymer of a styrene-based monomer and an unsaturated carboxylic acid ester.

In the case where a polyester resin is used, a known polyester resin can be used. Specific examples include a dibasic acid, a derivative of a dibasic acid (a carboxylic halide, ester, or acid anhydride), and a polycondensate of dihydric alcohol. Optionally, a tri- or poly-basic acid, a derivative of a tri- or poly-basic acid (a carboxylic halide, ester, or acid anhydride), a monobasic acid, a tri- or polyhydric alcohol, a monohydric alcohol, or the like may also be used.

Examples of the dibasic acid include: aliphatic dibasic acids such as maleic acid, fumaric acid, itaconic acid, oxalic acid, malonic acid, succinic acid, dodecyl succinic acid, dodecenyl succinic acid, adipic acid, azelaic acid, sebacic acid, decane-1,10-dicarboxylic acid; aromatic dibasic acids such as phthalic acid, tetrahydrophthalic acid, hexahydrophthalic acid, tetrabromophthalic acid, tetrachlorophthalic acid, het acid, himic acid, isophthalic acid, terephthalic acid, and 2,6-naphthalenedicarboxylic acid; and the like.

Also, examples of the derivative of a dibasic acid include: carboxylic halides, esters, and acid anhydrides of the above-described aliphatic dibasic acids; carboxylic halides, esters, and acid anhydrides of the above-described aromatic dibasic acids; and the like.

On the other hand, examples of the dihydric alcohol include: acyclic aliphatic diols such as ethylene glycol, 1,2-propanediol, 1,3-propanediol, 1,4-butanediol, 1,5-pentanediol, 1,6-hexanediol, diethylene glycol, dipropylene glycol, triethylene glycol, and neopentyl glycol; bisphenols such as bisphenol A and bisphenol F; alkylene oxide adducts of bisphenol A such as an ethylene oxide adduct of bisphenol A and a propylene oxide adduct of bisphenol A; aralkylene glycols such as xylylene diglycol; isosorbide; and the like.

Examples of the tri- or poly-basic acid and an anhydride of the tri- or poly-basic acid include trimellitic acid, trimellitic anhydride, pyromellitic acid, pyromellitic anhydride, and the like.

Wax

The toner particle preferably contains a wax. As the wax, for example, any of the following waxes can be used.

Examples include: hydrocarbon-based waxes such as a low-molecular weight polyethylene, a low-molecular weight polypropylene, an alkylene copolymer, a microcrystalline wax, a paraffin wax, and a Fischer-Tropsch wax; an oxide of a hydrocarbon-based wax such as oxidized polyethylene wax or a block copolymer of a hydrocarbon-based wax; a wax composed mainly of a fatty acid ester such as carnauba wax; and a wax obtained by partially or entirely deoxidizing a fatty acid ester such as deoxidized carnauba wax.

Other examples include: saturated straight-chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohol, behenyl alcohol, carnaubil alcohol, ceryl alcohol, and melissyl alcohol; polyhydric alcohols such as sorbitol; an ester of a fatty acid such as palmitic acid, stearic acid, behenic acid, or montanic acid with an alcohol such as stearyl alcohol, aralkyl alcohol, behenyl alcohol, carnaubil alcohol, ceryl alcohol, or melissyl alcohol; fatty acid amides such as linoleic acid amide, oleic acid amide, and lauric acid amide; saturated fatty acid bisamides such as methylene bis-stearic acid amide, ethylene bis-capric acid amide, ethylene bis-lauric acid amide, and hexamethylene bis-stearic acid amide; unsaturated fatty acid amides such as ethylene bis-oleic acid amide, hexamethylene bis-oleic acid amide, N,N'-dioleyl adipic acid amide, and N,N'-dioleyl cebasic acid amide; aromatic bisamides such as m-xylene bis-stearic acid amide, N,N'-distearyl isophthalic acid amide; fatty acid metal salts (so-called metal soaps) such as calcium stearate, calcium laurate, zinc stearate, and magnesium stearate; a grafted wax obtained by grafting an aliphatic hydrocarbon-based wax with a vinyl monomer such as styrene or acrylic acid; a partially esterified product of a fatty acid and a polyhydric alcohol such as behenic acid monoglyceride; and a methyl ester compound having a hydroxyl group obtained by hydrogenating a vegetable oil/fat.

The content of the wax is preferably from 0.5 parts by mass to 25.0 parts by mass or less relative to 100.0 parts by mass of the binder resin.

Also, from the viewpoint of achieving both the storability and the hot offset resistance of the toner, in an endothermic curve measured using a differential scanning calorimeter (DSC) during heating, the peak temperature of a maximum endothermic peak present in a temperature range from 30° C. to 200° C. is preferably from 50° C. to 110° C.

Carrier

From the viewpoint of obtaining stable images for a long period of time, the toner may be mixed with a magnetic carrier, and used as a two-component developer.

As the magnetic carrier, any of known magnetic carriers listed below can be used. Examples include: an iron powder with an oxidized surface; an unoxidized iron powder; metal particles of iron, lithium, calcium, magnesium, nickel, copper, zinc, cobalt, manganese, chromium, rare-earth metals, and the like; alloy particles thereof, oxide particles, and magnetic substances such as ferrite; and a magnetic dispersion resin carrier (so-called resin carrier) that contains a magnetic substance and a binder resin that holds the magnetic substance in a dispersed state.

Inorganic Fine Particle

The toner particle may be used as the toner without any processing. The toner may be obtained by adding any type of inorganic fine particle to the toner particle as an external additive, where necessary. As the inorganic fine particle, for example, any of the following inorganic fine particles can be used.

Examples include: silica, metal oxides (for example, strontium titanate, cerium oxide, alumina, magnesium oxide, and chromium oxide), nitrides (for example, silicon nitride), metal salts (for example, calcium sulfate, barium sulfate, and calcium carbonate), and fatty acid metal salts (for example, zinc stearate and calcium stearate).

The content of the inorganic fine particle used an external additive is preferably to 5.0 parts by mass relative to 100 parts by mass of the toner particle.

The inorganic fine particle may also be subjected to hydrophobic treatment to improve the flowability of the toner and uniformly charging the toner particle. Examples of treatment agents that can be used in the hydrophobic treatment of the inorganic fine particle include an unmodified silicone varnish, various types of modified silicone varnishes, an unmodified silicone oil, various types of modified silicone oils, a silane compound, a silane coupling agent, other organic silicon compounds, and an organic titanium compound. These treatment agents may be used alone or in combination.

Production Method

There is no particular limitation on the method for producing the toner particle. The toner particle may be produced using any known production method, but is preferably produced using a suspension polymerization method.

For example, a polymerizable monomer composition is obtained by mixing a polymerizable monomer that generates a binder resin, a compound represented by the structural formula (1), a compound represented by the structural formula (2), and optionally additives including an aluminum element-containing compound, a release agent, an additional colorant, and the like.

After that, the polymerizable monomer composition is added to a continuous phase (for example, an aqueous medium (that optionally may contain a dispersion stabilizing agent)). Then, in the continuous phase (in the aqueous medium), a particle of the polymerizable monomer composition is formed to polymerize the polymerizable monomer. In this way, a toner particle can be obtained.

Hereinafter, the methods for measuring various types of physical properties will be described.

Identification and Quantification of Binder Resin and Colorant

The identification of the composition and the ratio of constituent compounds of the resin, the colorant, and the like that are comprised in the toner is performed using a pyrolysis gas chromatography mass spectrometer (hereinafter also referred to as a pyrolysis GC/MS) and an NMR. When the resin comprised in the toner is available separately, the measurement can also be performed separately.

The analysis of the types of constituent compounds of the resin is performed using a pyrolysis GC/MS. The types of constituent compounds of the resin are identified by analyzing a mass spectrum of the components of degradants of the resin obtained when the resin is pyrolyzed at 550° C. to 700° C. Specific measurement conditions are as follows.

Measurement Conditions for Pyrolysis GC/MS

Pyrolyzer: JPS-700 (available from Japan Analytical Industry Co., Ltd.)

Pyrolysis temperature: 590° C.

GC/MS device: Focus GC/ISQ (available from Thermo Fisher)

Column: HP-5MS with a length of 60 m, an inner diameter of 0.25 mm, and a film thickness of 0.25 μm Injection port temperature: 200° C.

Flow pressure: 100 kPa

Split: 50 mL/min

MS ionization: EI

Ion source temperature: 200° C. Mass Range 45-650

Next, the abundance ratio of the identified constituent compounds of the resin is measured and calculated using a solid $^1$H-NMR. Structure determination is performed using nuclear magnetic resonance spectroscopy ($^1$H-NMR) [400 MHz, $CDCl_3$, room temperature (25° C.)].

Measurement device: FT NMR device JNM-EX 400 (available from JEOL Ltd.)

Measurement frequency: 400 MHz

Pulse condition: 5.0 μs

Frequency range: 10500 Hz

Number of integrations: 1024 times

From integral values of the obtained spectrum, the molar ratio of each monomer component is determined, based on which the composition ratio (mass %) is calculated. Here, the resin that accounts for 50 mass % or more of the toner is defined as the binder resin.

Content of Compound Represented by Structural Formula (2)

Production of Extracted Sample 18 g of ethanol is added to 2 g of the toner, and the mixture is irradiated with ultrasonic waves for 5 minutes. Next, the mixture is left to stand in a thermostatic chamber at 60° C. for 18 hours, and then left to stand at normal temperature for 24 hours. The supernatant is recovered and filtered using a PTFE syringe filter (with a pore size of 250 nm), and the filtrate is used as a measurement sample.

GC/MS Analysis

GC: TRACE-1310 (available from Thermo Fisher Scientific, Inc.)

MS: ISQ LT (available from Thermo Fisher Scientific, Inc.)

Column: HP-5MS with a length of 30 m, an inner diameter of 250 μm, and a film thickness of 0.25 μm (available from Agilent Technologies, Ltd.)

Carrier gas: He gas (with a purity of 99.99995%)

Injection port temperature: 250° C.

MS transfer line temperature: 250° C.

MS ion source temperature: 250° C.

MS ion source: EI (electron ionization method)

MS detection range (m/z): 45 to 800

GC column temperature: The temperature is held at 40° C. for 3 minutes, and then heated to 300° C. at a temperature increase rate of 10° C./min. After that, the temperature is held at 300° C. for 1 minute.

GC carrier gas flow rate: 1.5 mL/min

Injection method: Split injection method with a split ratio of 10/1

Injection amount: 1.0 μL Library: NIST

Creating Calibration Curve

A calibration curve is created using an isooctane solution (available from Fuji Chemicals, Ltd.) of the compound represented by the structural formula (2) as a standard sample. Specifically, solutions obtained by diluting the standard sample with ethanol to 5 different concentration levels (0.10 ppm, 0.25 ppm, 0.54 ppm, 1.16 ppm, and 26.5 ppm) are subjected to measurement as samples for creating a calibration curve. Then, a relationship between the peak area value and the concentration of the compound represented by the structural formula (2) is plotted to obtain a calibration curve. The calibration curve shows a favorable linearity with a correlation coefficient of 0.992. Next, the samples are subjected to measurement, and the content of the compound represented by the structural formula (2) comprised in the toner is calculated from the peak area value attributed to the structural formula (2).

Content of Compound Represented by Structural Formula (1)

The content of the compound represented by the structural formula (1) is calculated using a calibration curve created in the manner described below in the calculation of the content of the compound represented by the structural formula (2) described above.

A calibration curve is created using C.I. Pigment Yellow 155 as a standard sample. Specifically, solutions obtained by diluting the standard sample with ethanol to 5 different concentration levels (0.10%, 0.55%, 1.10%, 7.89%, and 15.7%) are subjected to measurement as samples for creating a calibration curve. Then, a relationship between the peak area value and the concentration of the compound represented by the structural formula (1) is plotted to obtain a calibration curve. The calibration curve shows a favorable linearity with a correlation coefficient of 0.986. Next, the samples are subjected to measurement, and the content of the compound represented by the structural formula (1) comprised in the toner is calculated from the peak area value attributed to the structural formula (1).

Method for Measuring Content of Aluminum Element

A wavelength dispersive X-ray fluorescence spectrometer ZSX Primus IV (available from Rigaku Corporation) is used as the measurement device together with the attached dedicated software ZSX Guidance (available from Rigaku Corporation) for measurement condition setting and measurement data analysis. An Rh anode X-ray tube is used, and measurement is performed in a vacuum atmosphere, with the measurement diameter being set to 30 mm and the measurement time being set to 20 seconds.

An aluminum ring (with an inner diameter of 40 mm, an outer diameter of 43 mm, and a height of 5 mm) is placed on a sample molding die in a semi-automatic Mini Press Machine (available from Specac Ltd.). 3 g of the toner is put into the die and pressure molded at a pressing pressure of 15 t for 1 minute to produce measurement pellets with a thickness of 3 mm and a diameter of 40 mm.

Measurement is performed under the above-described conditions to identify elements based on the obtained X-ray peak positions and determine the count rate (unit: cps) that is the number of X-ray photons per unit time. At this time, the acceleration voltage and the current value of the X-ray generator are set to 32 kV and 125 mA, respectively.

In the case where an aluminum-containing fine particle or the like is added to the toner particle as an external additive, the measurement may be performed based on the above-described method using the toner particle obtained after removing the external additive using a known method.

Creating Calibration Curve of Aluminum Element

As pellets for creating a calibration curve for determining the content, pellets are prepared by adding 0.001 parts by mass of aluminum hydroxide Al $(OH)_3$ relative to 100 parts by mass of a binder (product name: Spectro Blend, component: C 81.0, O 2.9, H 13.5, N 2.6 (mass %), chemical formula: $C_{19}H_{38}ON$, shape: powder (44 μm), available from Rigaku Corporation), thoroughly mixing them using a coffee mill, and molding the mixture in the same manner as the above-described measurement pellets are prepared. Likewise, pellets are prepared by mixing aluminum hydroxide by changing the amount to 0.005 parts by mass, 0.01 parts by mass, 0.05 parts by mass, 0.1 parts by mass, 0.5 parts by mass, 1.0 part by mass, and 5.0 parts by mass, and then molding the mixtures.

A calibration curve with a linear function is obtained, with the obtained count rate of X-ray photons on the vertical axis and the concentration of the aluminum element added in each of the samples for creating a calibration curve on the horizontal axis.

Based on the obtained calibration curve, the content of the aluminum element comprised in the toner particle of the toner is calculated.

Method for Calculating SP Value

The SP value is determined in the manner described below in accordance with the calculation method proposed by Fedors. For each polymerizable monomer, the evaporation energy (Δei) (cal/mol) and the molar volume (Δvi) ($cm^3$/mol) of an atom or an atomic group in the molecular structure are determined based on the table presented in Polym. Eng. Sci, 14 (2), 147-154 (1974), and $(\Sigma\Delta ei/\Sigma\Delta vi)^{0.5}$ is used as the SP value $(cal/cm^3)^{0.5}$.

As the SP value of the binder resin, for each monomer unit, the evaporation energy (Δei) and the molar volume (Δvi) of the monomer unit derived from the polymerizable monomer that constitutes the binder resin are determined, and multiplied by the molar ratio (j) of the binder resin of the monomer unit to obtain products. Then, the total sum of the evaporation energy of the monomer units is divided by the total sum of the molar volume of the monomer units, and $\{(\Sigma j\times\Sigma\Delta ei)/(\Sigma j\times\Sigma\Delta vi)\}^{0.5}$ is used as the SP value $(cal/cm^3)^{0.5}$.

Method for Measuring Weight-Average Particle Diameter (D4) of Toner Particle

The weight-average particle diameter (D4) of the toner particle is calculated by using a precision particle diameter distribution measuring device "Coulter Counter Multisizer 3" (registered trademark, manufactured by Beckman Coulter, Inc.), which is based on a pore electrical resistance method and equipped with a 100 μm aperture tube, and dedicated software "Beckman Coulter Multisizer 3 Version 3.51" (manufactured by Beckman Coulter, Inc.) provided therewith for setting measurement conditions and analyzing the measurement data, performing measurements at the number of effective measurement channels of 25,000 and analyzing the measurement data.

For the electrolytic aqueous solution used for measurement, a solution in which special grade sodium chloride is dissolved in ion-exchanged water so that the concentration is about 1% by mass, for example, "ISOTON II" (manufactured by Beckman Coulter, Inc.) can be used.

Before performing the measurement and analysis, the dedicated software is set as follows.

At the "Change Standard Measurement Method (SOM) Screen" of the dedicated software, the total number of counts in control mode is set to 50,000 particles, the number of measurements is set to 1, and a value obtained using "Standard Particle 10.0 μm" (manufactured by Beckman Coulter Co., Ltd.) is set as the Kd value. The threshold and noise level are automatically set by pressing the threshold/noise level measurement button. Also, the current is set to 1,600 μA, the gain is set to 2, the electrolytic solution is set to ISOTON II, and the flash of aperture tube after measurement is checked.

At the "Pulse to Particle Diameter Conversion Setting Screen" of the dedicated software, the bin interval is set to logarithmic particle diameter, the particle diameter bin is set to a 256 particle diameter bin, and the particle diameter range is set to from 2 μm to 60 μm.

The specific measurement method is as follows.

(1) About 200 mL of the electrolytic aqueous solution is placed in a 250 mL round-bottom glass beaker exclusively provided for Multisizer 3, the beaker is set on a sample stand, and a stirrer rod is stirred counterclockwise at 24 revolutions/second. Then, the dirt and air bubbles inside the aperture tube are removed using the "Flush Aperture Tube" function of the dedicated software.

(2) About 30 mL of the electrolytic aqueous solution is placed in a 100 mL flat-bottomed glass beaker, and about 0.3 mL of a below diluent is added thereto as a dispersing agent.

diluent: a diluent is obtained by 3-fold by mass dilution of "CONTAMINON N" (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) with ion-exchanged water.

(3) A predetermined amount of ion-exchanged water is placed in a water tank of a below ultrasonic disperser having an electrical output of 120 W and containing two oscillators with an oscillation frequency of 50 kHz that are built in with a phase shift of 180 degrees, and about 2 ml of the CONTAMINON N is added to the water tank.

ultrasonic disperser: "Ultrasonic Dispersion System Tetora 150" (manufactured by Nikkaki Bios Co., Ltd.)

(4) The beaker of (2) is set in the beaker fixing hole of the ultrasonic disperser and the ultrasonic disperser is operated. The height position of the beaker is adjusted so that the resonance state of the liquid level of the electrolytic aqueous solution in the beaker is maximized.

(5) While the electrolytic aqueous solution in the beaker in (4) above is being irradiated with ultrasonic waves, about 10 mg of toner is added little by little to the electrolytic aqueous solution and dispersed. Then, the ultrasonic dispersion treatment is continued for another 60 sec. In the ultrasonic dispersion, the temperature of water in the water tank is appropriately adjusted to from 15° C. to 40° C.

(6) The electrolytic aqueous solution of (5) in which the toner is dispersed is dropped using a pipette into the round-bottomed beaker of (1) installed in the sample stand, and the measured concentration is adjusted to about 5%. The measurement is continued until the number of measured particles reaches 50,000.

(7) The measurement data are analyzed with the dedicated software provided with the device, and the weight-average particle diameter (D4) is calculated. The weight-average particle diameter (D4) is the "average diameter" on the analysis/volume statistics (arithmetic mean) screen when graph/vol % is set using the dedicated software.

EXAMPLES

Hereinafter, the present invention will be described in further detail based on examples. The present invention should not be limited to the examples given below. Unless otherwise stated, parts and % shown in the following formulations are all based on mass.

Production of Polyester Resin 1 for Binder Resin

A monomer with a monomer composition shown in Table 1 was placed in a reaction chamber equipped with a nitrogen introduction tube, a drain tube, a stirrer, and a thermocouple, and then, 1.5 parts of dibutyl tin oxide was added to 100 parts of the total amount of the monomer as a catalyst. Next, the temperature was quickly increased to 180° C. at normal pressure in a nitrogen atmosphere. Then, water was distilled off while heating from 180° C. to 210° C. at a temperature increase rate of 10° C./hour so as to perform polycondensation.

After the temperature reached 210° C., the reaction chamber was depressurized to 5 kPa or less to perform polycondensation at 210° C. and 5 kPa or less. In this way, a polyester resin 1 (with an Mw of 8000, an Mn of 3500, and an acid value of 22.0 mgKOH/g) was obtained.

Production of Polyester Resin 2 for Binder Resin

A polyester resin 2 (with an Mw of 10000, an Mn of 4500, and an acid value of 31.0 mgKOH/g) was produced in the same manner as the production method of the polyester resin 1, except that the monomer composition was changed as shown in Table 1.

TABLE 1

| | | Polyester resin 1 | Polyester resin 2 |
|---|---|---|---|
| Amount of monomer composition to be prepared (part by mass) | Terephthalic acid | 35 | 49 |
| | Trimellitic acid | 3 | 3 |
| | BPA-PO | 58 | 5 |
| | Ethylene glycol | 10 | 18 |
| | Isosorbide | 0 | 25 |
| Physical properties of resin | SP value | 10.57 | 11.54 |

BPA-PO: Bisphenol A-propylene oxide 2-mol adduct

The SP value is expressed in the unit of $(cal/cm^3)^{0.5}$.

Production of Toner 1

Production of Polyester Resin A for Shell Formation

The following ingredients were placed in an autoclave equipped with a depressurization device, a water separator device, a nitrogen gas introduction device, a temperature measurement device, and a stirrer device.

| | |
|---|---|
| terephthalic acid | 32.3 parts (50.0 mol %) |
| bisphenol A-propylene oxide 2-mol adduct | 67.7 parts (50.0 mol %) |
| potassium titanium oxalate (catalyst) | 0.02 parts |

Next, in a nitrogen atmosphere, the ingredients were reacted at 220° C. under normal pressure until a desired molecular weight was reached. After the temperature was decreased, the resultant was pulverized to obtain a polyester resin A for shell formation (with an Mw of 6000, an Mn of 2500, and an acid value of 11.2 mgKOH/g).

Preparation of Dispersion Solution 100.0 parts of ion exchange water, 5.0 parts of sodium phosphate, and 0.8 parts of 10 mass % hydrochloric acid were placed in a granulation tank to produce an aqueous solution of sodium phosphate, and the aqueous solution was heated to 50° C. An aqueous solution of calcium chloride prepared by dissolving 1.0 part of calcium chloride hexahydrate in 7.0 parts of ion exchange water was added to the granulation tank, and they were stirred at a circumferential speed of 25 m/s for 30 minutes using a T.K. Homo Mixer (available from Tokushu Kika Kogyo Co., Ltd.). In this way, a calcium phosphate fine particle-containing dispersion solution (water dispersion) was obtained as a water-insoluble inorganic fine particle.

Preparation of Pigment Dispersion Composition 1

| | |
|---|---|
| polymerizable monomer (styrene): | 50.0 parts |
| colorant (C.I. Pigment Yellow 155): | 6.0 parts |
| compound represented by structural formula (2): | 0.0003 parts |
| aluminum distearate: | 0.12 parts |

The above ingredients were introduced into an attritor (available from Nippon Coke Co., Ltd.) and stirred at 200 rpm at a temperature of 25° C. for 180 minutes using zirconia beads with a radius of 1.25 mm to prepare a pigment dispersion composition 1.

Preparation of Pigment Dispersion Composition 2

A pigment dispersion composition 2 was prepared in the same manner as the preparation method of the pigment dispersion composition 1, except that 0.0003 parts of dehydroabietic acid was added instead of the compound represented by the structural formula (2).

Preparation of Colorant-Containing Composition 1

The following ingredients were introduced into the same container, and mixed and dispersed at a circumferential speed of 20 m/s using a T.K. Homo Mixer (available from Tokushu Kika Kogyo Co., Ltd.).

| | |
|---|---|
| pigment dispersion composition 1: | 56.1003 parts |
| polymerizable monomer: styrene: | 20.0 parts |
| polymerizable monomer: n-butyl acrylate: | 30.0 parts |
| colorant (C.I. Solvent Yellow 98): | 1.0 part |
| polyester resin A: | 2.0 parts |
| cross-linking agent: divinylbenzene | 0.5 parts |

Furthermore, after the mixture was heated to 60° C., 9.0 parts of behenyl behenate as a release agent was introduced, and then dispersed and mixed for 30 minutes to prepare a colorant-containing composition 1.

Production of Toner Particle 1

The colorant-containing composition 1 obtained above was introduced into a calcium phosphate fine particle-containing dispersion solution, and they were stirred at a circumferential speed 30 m/s in a nitrogen atmosphere at a temperature of 60° C. using a T.K. Homo Mixer (product name, available from Tokushu Kika Kogyo Co., Ltd.). Then, 9.0 parts of t-butyl peroxypivalate (product name Perbutyl PV available from NOF Corporation with a molecular weight of 174.2 and a 10-hour half-life temperature of 58° C.) as a polymerization initiator was added to the mixture to prepare a polymerizable monomer composition particle-containing dispersion solution.

Next, the polymerizable monomer composition particle-containing dispersion solution obtained above was transferred to another tank and heated to a temperature of 70° C. while stirring the dispersion solution using a paddle stirring blade to react at 70° C. for 5 hours. After that, the solution temperature was set to 82° C., and the dispersion solution was further reacted for 2 hours. After cooling, dilute hydrochloric acid was added to a pH of 1.5 while stirring the dispersion solution so as to dissolve the dispersion stabilizing agent. The solid component was filtered and separated, and then thoroughly washed with ion exchange water. After that, the solid component was vacuum dried at 40° C. for 24 hours to obtain a toner particle 1 with a weight average particle size (D4) of 6.8 μm. The molecular weight of the THF soluble content of the obtained toner particle 1 was measured and found that Mw was 9000 and Mn was 5000.

External Additive Adding Step 1.5 parts of hydrophobic silica (RY50 available from Nippon Aerosil Co., Ltd.) was added to 100 parts of the toner particle 1 obtained above, and they were mixed using a Mitsui Henschel Mixer (available from Mitsui Miike Chemical Engineering Machinery). After that, the mixture was sieved using a vibration sieve with an aperture of 45 μm to obtain a toner 1.

Production of Toners 2, 3, 5, and 7 to 13

Toners 2, 3, 5, and 7 to 13 were obtained in the same manner, except that the amount of the compound represented by the structural formula (2) and the amount of aluminum distearate added when preparing the pigment dispersion composition 1 of the toner 1 were changed as shown in Table 2, and the amount of the polymerizable monomer added when preparing the colorant-containing composition 1 was changed.

TABLE 2

| | | Styrene Part | n-Butyl acrylate Part | Pigment Part | Structural formula (2) compound Part | Aluminum distearate Part |
|---|---|---|---|---|---|---|
| Example 1 | Toner 1 | 20.0 | 30.0 | 6.0 | 0.0003 | 0.12 |
| Example 2 | Toner 2 | 20.0 | 30.0 | 6.0 | 0.0003 | 1.2 |
| Example 3 | Toner 3 | 20.0 | 30.0 | 6.0 | 0.0003 | 0.06 |
| Example 4 | Toner 4 | Described in the specification | | | | None |
| Example 5 | Toner 5 | 25.0 | 25.0 | 6.0 | 0.0003 | 0.05 |
| Example 6 | Toner 6 | Described in the specification | | | | None |
| Example 7 | Toner 7 | 30.0 | 20.0 | 4.0 | 0.0008 | 0.035 |
| Example 8 | Toner 8 | 30.0 | 20.0 | 4.5 | 0.0012 | 0.04 |
| Example 9 | Toner 9 | 30.0 | 20.0 | 6.5 | 0.00006 | 0.06 |
| Example 10 | Toner 10 | 30.0 | 20.0 | 12.6 | 0.00005 | 0.1 |
| Example 11 | Toner 11 | 30.0 | 20.0 | 0.6 | 0.0014 | 0.005 |
| Example 12 | Toner 12 | 30.0 | 20.0 | 15.5 | 0.00004 | 0.1 |
| Example 13 | Toner 13 | 30.0 | 20.0 | 0.3 | 0.001 | 0.002 |
| Comparative Example 1 | Toner 14 | 20.0 | 30.0 | 6.0 | — | 0.12 |
| Comparative Example 2 | Toner 15 | 20.0 | 30.0 | 6.0 | 0.00002 | None |

In Table 2, the parts of styrene and the parts of n-butyl acrylate are shown in parts added to the pigment dispersion composition when preparing the colorant-containing composition. The values shown in the Pigment column indicate the parts of the compound represented by the structural formula (1).

Production of Toner 14

A toner 14 was obtained in the same manner, except that the pigment dispersion composition 1 was changed to the pigment dispersion composition 2 when preparing the colorant-containing composition 1 of the toner 1.

Production of Toner 4

Preparation of Polyester Resin Particle Dispersion Solution

| | |
|---|---|
| polyester resin 1: | 200.0 parts |
| ion exchange water: | 500.0 parts |

The above ingredients were placed in a stainless steel container, and heated to and melted in a warm bath. Then, 0.1N sodium hydrogencarbonate was added while thoroughly stirring the mixture at 7800 rpm using a homogenizer (Ultra Turrax T50 available from IKA) to increase the pH to a value greater than 7.0. After that, a mixed solution of 3 parts of sodium dodecylbenzenesulfonate and 297 parts of ion exchange water was gradually added dropwise to perform emulsification and dispersion. In this way, a polyester resin particle dispersion solution was obtained.

The obtained polyester resin particle dispersion solution was subjected to particle size distribution measurement using a particle size measurement device (LA-950 available from Horiba, Ltd.). As a result, it was found that the number-average particle size of the polyester resin particle contained in the dispersion solution was 0.25 and a coarse particle with a particle size greater than 1 μm was not observed.

Preparation of Wax Particle Dispersion Solution

| | |
|---|---|
| ion exchange water: | 500.0 parts |
| behenyl behenate: | 250.0 parts |

The above ingredients were placed in a stainless steel container, and heated to and melted in a warm bath. Then, 0.1N sodium hydrogencarbonate was added while thoroughly stirring the mixture at 7800 rpm using a homogenizer (Ultra Turrax T50 available from IKA) to increase the pH to a value greater than 7.0. After that, a mixed solution of 5 parts by mass of sodium dodecylbenzenesulfonate and 245 parts of ion exchange water was gradually added dropwise to perform emulsification and dispersion. The wax particle contained in the wax particle dispersion solution was subjected to particle size distribution measurement using a particle size measurement device (LA-920 available from Horiba, Ltd.). As a result, it was found that the number-average particle size of the wax particle contained in the wax particle dispersion solution was 0.35 and a coarse particle with a particle size greater than 1 μm was not observed.

Preparation of Colorant Particle Dispersion Solution

| | |
|---|---|
| colorant (C.I. Pigment Yellow 155): | 150.0 parts |
| sodium dodecylbenzenesulfonate: | 5.0 parts |
| compound represented by structural formula (2): | 0.0075 parts |
| ion exchange water: | 350.0 parts |

The above ingredients were mixed and dispersed using a sand grinder mill. The colorant particle contained in the colorant particle dispersion solution was subjected to particle size distribution measurement using a particle size measurement device (LA-920 available from Horiba, Ltd.). As a result, it was found that the number-average particle size of the colorant particle contained in the colorant particle dispersion solution was 0.2 and a coarse particle with a particle size greater than 1 μm was not observed.

Production of Toner Particle 4

| | |
|---|---|
| polyester resin particle dispersion solution: | 450.0 parts |
| colorant particle dispersion solution: | 100.0 parts |
| wax particle dispersion solution: | 45.0 parts |
| sodium dodecylbenzenesulfonate: | 5.0 parts |

The polyester resin particle dispersion solution, the wax particle dispersion solution, and sodium dodecylbenzenesulfonate were placed in a reactor (a 1-liter volume baffled flask with an anchor blade) and mixed until uniform. Meanwhile, the colorant particle dispersion solution was mixed in a 500 mL beaker until uniform, and the mixture was gradually added to the reactor while stirring to obtain a mixed dispersion solution. An aqueous solution of aluminum chloride with a solid content of 9.8 parts was added dropwise to the obtained mixed dispersion solution while stirring to form an aggregated particle.

After the aqueous solution had been added dropwise, the inside of the system was replaced with nitrogen, and held at 50° C. for 1 hour, and then at 55° C. for 1 hour.

After that, the temperature was increased to 90° C. and held for 30 minutes. Then, the temperature was decreased to 63° C. and held for 3 hours to form a fusion particle. After a predetermined period of time, the resultant was cooled to normal temperature (about 25° C.) at a temperature decrease rate of 0.5° C. per minute, and washed and filtered for solid-liquid separation. After that, the particle was dried using a vacuum dryer to obtain a toner particle 4.

External Additive Adding Step

A toner 4 was obtained in the same manner as in the external additive adding step of the toner particle 1, except that the toner particle 4 was used.

Production of Toner 6

A toner 6 was obtained in the same manner, except that the polyester resin 1 was changed to the polyester resin 2 when preparing the polyester resin particle dispersion solution of the toner 4, the amount of the compound represented by the structural formula (2) was changed to 0.0015 parts when preparing the colorant particle dispersion solution, and the amount of the polyester resin particle dispersion solution and the amount of the colorant particle dispersion solution were changed to 420 parts and 130 parts, respectively, and the aqueous solution of aluminum chloride added was changed to an aqueous solution of aluminum chloride with a solid content of 12.8 parts in the toner particle production step.

Production of Toner 15

Preparation of Dispersion Solution

In a granulation tank, 250.0 parts of ion exchange water and 10.2 parts of magnesium chloride were dissolved to produce an aqueous solution of magnesium chloride. An aqueous solution obtained by dissolving 6.2 parts of sodium hydroxide in 50.0 parts of ion exchange water was gradually added to the granulation tank while stirring the aqueous solution at a circumferential speed of 25 m/s using a T.K. Homo Mixer (product name, available from Tokushu Kika Kogyo Co., Ltd.) to obtain a magnesium hydroxide (fine particle)-containing dispersion solution.

Preparation of Pigment Dispersion Composition 3

| | |
|---|---|
| polymerizable monomer (styrene): | 50.0 parts |
| colorant (C.I. Pigment Yellow 155): | 6.0 parts |
| compound represented by the structural formula (2): | 0.00002 parts |

The above ingredients were introduced into an attritor (available from Nippon Coke Co., Ltd.) and stirred at 200 rpm at a temperature of 25° C. for 180 minutes using zirconia beads with a radius of 1.25 mm to prepare a pigment dispersion composition 3.

Preparation of Colorant-Containing Composition 3

The following ingredients were introduced into the same container, and mixed and dispersed at a circumferential speed of 20 m/s using a T.K. Homo Mixer (product name, available from Tokushu Kika Kogyo Co., Ltd.).

| | |
|---|---|
| pigment dispersion composition 3: | 56.00002 parts |
| polymerizable monomer: styrene | 20.0 parts |
| polymerizable monomer: n-butyl acrylate | 30.0 parts |
| colorant (Solvent Yellow 98) | 1.0 part |
| charge control agent: FCA-5 (product name, available from Fujikura Kasei Co., Ltd.) | 2.0 parts |
| cross-linking agent: divinylbenzene | 0.5 parts |

Furthermore, after the mixture was heated to 60° C., 10.0 parts of behenyl behenate as a release agent was introduced, and dispersed and mixed for 30 minutes to prepare a colorant-containing composition 3.

Production of Polymerizable Monomer Composition Particle

The colorant-containing composition 3 obtained above was introduced into a magnesium hydroxide fine particle-containing dispersion solution, and they were stirred at a circumferential speed of 30 m/s in a nitrogen atmosphere at a temperature of 60° C. using a T.K. Homo Mixer (product name, available from Tokushu Kika Kogyo Co., Ltd.). Then, 9.0 parts of t-butyl peroxypivalate (product name Perbutyl PV available from NOF Corporation with a molecular weight of 174.2 and a 10-hour half-life temperature of 58° C.) as a polymerization initiator was added to the mixture to prepare a polymerizable monomer composition particle-containing dispersion solution.

Next, the polymerizable monomer composition particle-containing dispersion solution obtained above was transferred to another tank and heated to a temperature of 70° C. while stirring the dispersion solution using a paddle stirring blade to polymerize.

When the conversion rate of the polymerizable monomer reached 95%, the dispersion solution was heated to 90° C., and 2.0 parts of methyl methacrylate as a polymerizable monomer for shell formation and an aqueous solution obtained by dissolving 0.2 parts of 2,2'-azo bis(N-butyl-2-methylpropionamide) in 10 parts of ion exchange water as a water-soluble initiator were added. The resultant was polymerized at 90° C. for 3 hours to obtain a polymerization reaction solution (polymerization slurry) containing the toner particle 1.

After cooling, sulfuric acid was added to change the pH to 6.5 or less, and the solution was stirred for 2 hours to dissolve the water-insoluble inorganic fine particle on the toner particle surface. The toner particle-containing dispersion solution was filtered and separated, and then washed with water and dried at a temperature of 40° C. for 48 hours to obtain a toner particle 15 with a weight average particle size (D4) of 6.8 μm and a core-shell structure.

External Additive Adding Step 100.0 parts of the toner particle 15 and 1.5 parts of a dry silica particle (AEROSIL (registered trademark) REA90 available from Nippon Aerosil Co., Ltd., positive charge hydrophobic treated-silica particle) were mixed for 3 minutes using a FM mixer (available from Nippon Coke Co., Ltd.) to attach the silica particle to the toner particle 15. After that, the mixture was sieved using a 300 mesh sieve (with an aperture of 48 μm) to obtain a toner 15.

Physical Properties of Toners 1 to 15

The toners 1 to 15 were subjected to various types of physical property measurements that were described above. The results obtained from the physical property measurements are shown in Table 4.

TABLE 3

| | | content of structural formula (1) compound Mass % | content of structural formula (2) compound Mass ppm | Ratio (A) of the content (structural formula (1)/ structural formula (2)) | SP value of binder resin $(cal/cm^3)^{0.5}$ | Ratio (B) of the content (Structural formula (1)/ aluminum element) |
|---|---|---|---|---|---|---|
| Example 1 | Toner 1 | 5.0 | 2.5 | 20000 | 9.7 | 50 |
| Example 2 | Toner 2 | 5.0 | 2.5 | 20000 | 9.7 | 5 |
| Example 3 | Toner 3 | 5.0 | 2.5 | 20000 | 9.7 | 100 |
| Example 4 | Toner 4 | 4.9 | 2.5 | 20000 | 10.6 | 3 |
| Example 5 | Toner 5 | 5.0 | 2.5 | 20000 | 9.5 | 110 |
| Example 6 | Toner 6 | 6.4 | 0.6 | 100000 | 11.5 | 3 |
| Example 7 | Toner 7 | 3.4 | 6.8 | 5000 | 9.0 | 113 |
| Example 8 | Toner 8 | 3.8 | 10.0 | 3800 | 9.0 | 113 |
| Example 9 | Toner 9 | 5.4 | 0.5 | 110000 | 9.0 | 108 |
| Example 10 | Toner 10 | 10.0 | 0.4 | 250000 | 9.0 | 126 |
| Example 11 | Toner 11 | 0.5 | 12.0 | 420 | 9.0 | 120 |
| Example 12 | Toner 12 | 12.0 | 0.3 | 400000 | 9.0 | 155 |
| Example 13 | Toner 13 | 0.3 | 12.0 | 250 | 9.0 | 150 |
| Comparative Example 1 | Toner 14 | 5.0 | — | — | 9.7 | 50 |
| Comparative Example 2 | Toner 15 | 5.0 | 0.1 | 600000 | 9.7 | — |

Fogging Evaluation

Each toner in an amount of 300 g was left to stand in a thermostatic chamber at and 95% RH for 30 days to evaluate the toner after left in a severe condition. A color laser beam printer (HP LaserJet Enterprise Color M652n) available from Hewlett-Packard Company was used as an image forming device, and the printer was modified to have a process speed of 300 mm/sec.

An HP 656X LaserJet Toner Cartridge (yellow) was used as a cartridge. The toner originally contained in the cartridge was removed from the cartridge. The cartridge was cleaned by blowing air, and then filled with 300 g of the toner to be evaluated.

The toner was evaluated by performing the following test using the cartridge. The evaluation was performed by attaching the cartridge to the yellow station and dummy cartridges to the other stations. The toner 15 was a positively charged toner, and thus various potential settings were changed so as to enable development of the positively charged toner.

Evaluation conditions were as follows. Reflection coefficient (%) was measured using a Reflectometer Model TC-6DS (available from Tokyo Denshoku Co., Ltd.) for a non-image portion of each of images with horizontal lines at a print percentage of 0.5% printed in a hot and humid environment (at a temperature of 32° C. and a humidity of 85% RH) after printing the initial print and 30000 prints in a print-out test.

The obtained reflection coefficient was evaluated based on the following criteria using a numerical value (%) obtained by subtracting from the reflection coefficient (%) of unused printout paper (standard paper) measured in the same manner. The smaller the numerical value, the more image fogging is suppressed. The evaluation was performed in glossy paper mode using plain paper (HP Brochure Paper 200 g, Glossy, available from HP, 200 g/m$^2$).

Evaluation Criteria

A: less than 0.5%

B: 0.5% or more and less than 1.5%

C: 1.5% or more and less than 3.0%

D: 3.0% or more

Image Density Non-Uniformity

Each toner in an amount of 300 g was left to stand in a thermostatic chamber at 40° C. and 95% RH for 30 days to evaluate the toner after left in a severe condition. An image shown in the FIGURE was printed in a hot and humid environment (at a temperature of 32° C. and a humidity of 85% RH), and evaluation was performed based on the difference between the image density of a solid image downstream of a print portion and the image density of a solid image downstream of a non-print portion.

For image density measurement, a relative density to a printout image of a white background portion with an original density of 0.00 was measured using a Macbeth Reflective Densitometer RD 918 (available from Macbeth).

As the transfer material, letter size plain paper (XEROX 4200, available from XEROX, 75 g/m$^2$) was used.

Evaluation Criteria

A: less than 0.05

B: 0.05 or more and less than 0.10

C: 0.10 or more and less than 0.20

D: 0.20 or more

Image Density

The tinting strength of each toner was evaluated based on the image density of a solid image (the amount of toner printed: 0.4 mg/cm$^2$). For image density measurement, a relative density to a printout image of a white background portion with an original density of 0.00 was measured using a Macbeth Reflective Densitometer RD918 (available from available from Macbeth). As the recording medium, letter size plain paper (XEROX 4200, available from XEROX, 75 g/m$^2$) was used.

Evaluation Criteria

A: 1.40 or more

B: 1.20 or more and less than 1.40

C: 1.00 or more and less than 1.20

D: less than 1.00

Examples 1 to 13

In Examples 1 to 13, the above-described evaluations were performed using each of the toners 1 to 13 as the toner. The results of the evaluations are shown in Table 4.

Comparative Examples 1 and 2

In Comparative Examples 1 and 2, the above-described evaluations were performed using each of the toners 14 and 15 as the toner. The results of the evaluations are shown in Table 4.

TABLE 4

| | | Fogging (%) | | | Image |
|---|---|---|---|---|---|
| | | Initial print | After 30000 prints | Image density | density non-uniformity |
| Example 1 | Toner 1 | A(0.1) | A(0.2) | A(1.50) | A(0.01) |
| Example 2 | Toner 2 | A(0.1) | A(0.3) | A(1.48) | A(0.01) |
| Example 3 | Toner 3 | A(0.1) | A(0.4) | A(1.49) | A(0.01) |
| Example 4 | Toner 4 | A(0.2) | B(0.6) | A(1.41) | A(0.03) |
| Example 5 | Toner 5 | A(0.2) | B(0.6) | A(1.48) | A(0.03) |
| Example 6 | Toner 6 | A(0.4) | B(0.8) | A(1.52) | B(0.05) |
| Example 7 | Toner 7 | A(0.4) | B(0.8) | B(1.38) | B(0.05) |
| Example 8 | Toner 8 | B(0.6) | B(0.8) | A(1.40) | B(0.05) |
| Example 9 | Toner 9 | B(0.6) | B(1.1) | A(1.54) | B(0.07) |
| Example 10 | Toner 10 | B(1.0) | C(1.7) | A(1.75) | B(0.08) |
| Example 11 | Toner 11 | B(0.7) | B(0.9) | C(1.03) | B(0.06) |
| Example 12 | Toner 12 | B(1.3) | C(2.1) | A(1.79) | B(0.09) |
| Example 13 | Toner 13 | B(0.8) | B(1.4) | C(1.00) | B(0.08) |
| Comparative Example 1 | Toner 14 | C(2.0) | D(3.2) | A(1.49) | D(0.20) |
| Comparative Example 2 | Toner 15 | C(1.7) | D(3.0) | A(1.50) | C(0.17) |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-092760, filed Jun. 8, 2022 which is hereby incorporated by reference herein in its entirety.

What is claimed is:

1. A toner comprising a toner particle comprising a binder resin, wherein the toner particle comprises a compound represented by a following structural formula (1) and a compound represented by a following structural formula (2), and a content of the compound represented by the following structural formula (2) comprised in the toner is 0.3 mass ppm or more, (1)

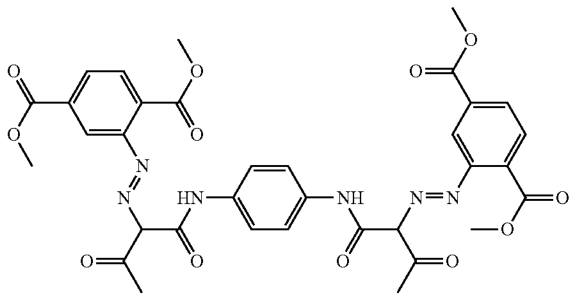

(2)

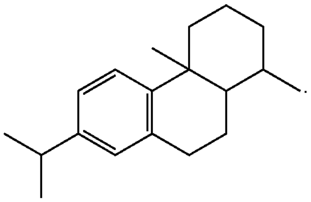

2. The toner according to claim 1, wherein a content of the compound represented by the structural formula (1) comprised in the toner is 0.5 to 10.0 mass %.

3. The toner according to claim 1, wherein the content of the compound represented by the structural formula (2) comprised in the toner is 0.5 to 10.0 mass ppm.

4. The toner according to claim 1, wherein a value of a ratio (A) of the content of the compound represented by the structural formula (1) comprised in the toner relative to the content of the compound represented by the structural formula (2) comprised in the toner is 5000 to 100000, (A)=the content of the compound represented by the structural formula (1)/the content of the compound represented by the structural formula (2).

5. The toner according to claim 1, wherein the binder resin has an SP value of 9.5 to 10.6 $(cal/cm^3)^{0.5}$.

6. The toner according to claim 1, wherein the toner particle comprises an aluminum element, a value of a ratio (B) of the content of the compound represented by the structural formula (1) comprised in the toner relative to the content of the aluminum element comprised in the toner particle of the toner is 3 to 105, (B)=the content of the compound represented by the structural formula (1)/the content of the aluminum element.

7. The toner according to claim 1, wherein the binder resin comprises at least one resin selected from a group consisting of a vinyl resin and a polyester resin.

* * * * *